US012350589B2

(12) United States Patent
Azmandian et al.

(10) Patent No.: US 12,350,589 B2
(45) Date of Patent: Jul. 8, 2025

(54) METHOD AND SYSTEM FOR AUTO-PLAYING PORTIONS OF A VIDEO GAME

(71) Applicant: Sony Interactive Entertainment Inc., Tokyo (JP)

(72) Inventors: Mahdi Azmandian, San Mateo, CA (US); Olga Rudi, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 316 days.

(21) Appl. No.: 17/960,442

(22) Filed: Oct. 5, 2022

(65) Prior Publication Data

US 2024/0115948 A1 Apr. 11, 2024

(51) Int. Cl.
*A63F 13/56* (2014.01)
*A63F 13/533* (2014.01)

(52) U.S. Cl.
CPC ............ *A63F 13/56* (2014.09); *A63F 13/533* (2014.09); *A63F 2300/308* (2013.01); *A63F 2300/6607* (2013.01)

(58) Field of Classification Search
CPC ........ A63F 13/50; A63F 13/56; A63F 13/533; A63F 2300/308; A63F 2300/6607
See application file for complete search history.

(56) References Cited

U.S. PATENT DOCUMENTS

| 6,663,492 | B2 * | 12/2003 | Thompson | A63F 13/45 463/43 |
| 8,303,416 | B1 * | 11/2012 | Thakkar | G06F 3/048 463/42 |
| 2005/0246638 | A1 * | 11/2005 | Whitten | A63F 13/10 715/708 |

(Continued)

FOREIGN PATENT DOCUMENTS

KR 20180006172 A 1/2018

OTHER PUBLICATIONS

PCT Notification of Transmittal of the International Search Report & the Written Opinion of the International Searching Authority, issued in corresponding PCT/2023/075615, mailed Feb. 8, 2024 (14 total pages).

(Continued)

*Primary Examiner* — Steve Rowland
(74) *Attorney, Agent, or Firm* — Kilpatrick Townsend & Stockton LLP (57) ABSTRACT

A method for providing an auto-play mode option to a user during gameplay of a video game includes accessing, by a server, a user play model, which incorporates extracted features related to gameplay by the user and classification of the extracted features. The accessing of the model is triggered at a current time during gameplay. The method also includes identifying, by the server, predicted interactive activity that is predicted to occur ahead of the current time of gameplay. The method further includes identifying, by the (Continued)

server, at least part of the predicted interactive activity to be anticipated grinding content (AGC). The method also includes providing a notification, by the server, to a display screen of a user device, where the notification identifies the AGC in upcoming gameplay and provides the user with an option to use the auto-play mode during gameplay of the AGC.

9 Claims, 5 Drawing Sheets

(56) References Cited

U.S. PATENT DOCUMENTS

| | | | | |
|---|---|---|---|---|
| 2006/0246972 | A1* | 11/2006 | Thomas | A63F 13/00 463/4 |
| 2006/0287075 | A1* | 12/2006 | Walker | G07F 17/3269 463/25 |
| 2008/0318656 | A1* | 12/2008 | Walker | G07F 17/3262 463/20 |
| 2011/0237335 | A1* | 9/2011 | Holloway | A63F 13/47 463/42 |
| 2011/0281638 | A1* | 11/2011 | Bansi | A63F 13/795 463/29 |
| 2012/0052939 | A1* | 3/2012 | Lutnick | G07F 17/3262 463/25 |
| 2012/0094765 | A1* | 4/2012 | Reynolds | A63F 13/497 463/42 |
| 2012/0184353 | A1* | 7/2012 | Anderson | G07F 17/3225 463/25 |
| 2013/0190094 | A1* | 7/2013 | Ronen | A63F 13/79 463/42 |
| 2014/0018143 | A1* | 1/2014 | Yarbrough | G07F 17/3262 463/19 |
| 2014/0155136 | A1* | 6/2014 | Augustine | G07F 17/3227 463/20 |
| 2015/0294534 | A1* | 10/2015 | Augustine | G07F 17/3258 463/27 |
| 2018/0001205 | A1* | 1/2018 | Osman | A63F 13/67 |
| 2018/0001206 | A1 | 1/2018 | Osman et al. | |
| 2019/0209925 | A1* | 7/2019 | Benedetto | A63F 13/352 |
| 2019/0232169 | A1* | 8/2019 | Benedetto | A63F 13/422 |
| 2019/0321727 | A1* | 10/2019 | Rodgers | A63F 13/335 |
| 2019/0332245 | A1* | 10/2019 | Wakeford | A63F 13/67 |
| 2022/0176244 | A1* | 6/2022 | Musbah | A63F 13/35 |
| 2022/0176252 | A1* | 6/2022 | Dicken | G06N 3/04 |
| 2022/0219087 | A1 | 7/2022 | Beltran et al. | |

OTHER PUBLICATIONS

Anonymous: "Drivatar (TM) in Forza Motorsport—Microsoft Research", Apr. 19, 2014 (Apr. 19, 2014), XP055205468, Retrieved from the Internet: URL:https://web.archive.org/web/20140419214409/ http://research.microsoft.com/en-us/projects/drivatar/forza.aspx [retrieved on Jul. 30, 2015] the whole document.

* cited by examiner

METHOD AND SYSTEM FOR AUTO-PLAYING PORTIONS OF A VIDEO GAME

BACKGROUND

Although game developers strive to make video games exciting and interesting to play over the course of the entire game, players typically find some portions of a video game less exciting or less interesting to play than other portions of the game. For example, some players might find a video game less exciting to play during a portion of the game in which the players are required to perform repetitive tasks. Other players might be less interested in playing a portion of a video game that involves a quest they do not like. Still other players might be less interested in playing a portion of a video game which is not compatible with the player's skill set. Each of these scenarios can adversely impact a player's enjoyment of the video game.

It is in this context that embodiments arise.

SUMMARY

In an example embodiment, a method for providing an auto-play mode option to a user during gameplay of a video game by the user is provided. The method includes accessing, by a server, a user play model of the user, with the user play model incorporating extracted features related to the gameplay by the user and classification of the extracted features related to the gameplay by the user. The accessing of the user play model is triggered at a current time during the gameplay by the user and the method further includes identifying, by the server, predicted interactive activity that is predicted to occur ahead of the current time of the gameplay by the user. The predicted interactive activity is identified in part using data from the user play model. The method also includes identifying, by the server, at least part of the predicted interactive activity to be anticipated grinding content (AGC), with the anticipated grinding content (AGC) being identified in part using data from the user play model. Still further, the method includes providing a notification, by the server, that is presented to a display screen of a user device used by the user during the gameplay, where the notification identifies the AGC in upcoming gameplay and provides the user with an option to use an auto-play mode during gameplay of the AGC.

In one embodiment, the auto-play mode uses data from the user play model to automatically play the AGC for the user using a gameplay style that simulates a gameplay style of the user. In one embodiment, the user play model is trained from one or more game sessions by the user using data state data produced during the one or more game sessions to produce the extracted features from game context, game inputs, and game performance for further processing the classification of the extracted features. This training provides reinforced learning that assists in continuously strengthening the user play model to increase a degree to which the user play model can simulate a gameplay style of the user.

In one embodiment, the option for the auto-play mode is enabled responsive to the user choosing to allow the auto-play mode to play the AGC, and, when gameplay of the AGC in auto-play mode is complete, a resume notification is presented to the display screen of the user device used by the user during the gameplay. The resume notification provides the user with an option to discontinue use of the auto-play mode and resume gameplay in active play mode.

In one embodiment, for each segment of AGC completed using auto-play mode, game metrics related to the auto-play mode are saved for viewing.

In another example embodiment, a non-transitory computer readable medium containing program instructions for providing an auto-play mode option to a user during gameplay of a video game by the user is provided. The execution of the program instructions by one or more processors of a computer system causes the one or more processors to carry out the operations of accessing, by a server, a user play model of the user, the user play model incorporating extracted features related to the gameplay by the user and classification of the extracted features related to the gameplay by the user, the accessing of the user play model is triggered at a current time during the gameplay by the user, identifying, by the server, predicted interactive activity that is predicted to occur ahead of the current time of the gameplay by the user, the predicted interactive activity is identified in part using data from the user play model, identifying, by the server, at least part of the predicted interactive activity to be AGC, the AGC is identified in part using data from the user play model, and providing a notification, by the server, that is presented to a display screen of a user device used by the user during the gameplay. The notification identifies the AGC in upcoming gameplay and provides the user with an option to use an auto-play mode during gameplay of the AGC.

Other aspects and advantages of the disclosures herein will become apparent from the following detailed description, taken in conjunction with the accompanying drawings, which illustrate by way of example the principles of the disclosures.

DETAILED DESCRIPTION

In the following description, numerous specific details are set forth in order to provide a thorough understanding of the example embodiments. However, it will be apparent to one skilled in the art that the example embodiments may be practiced without some of these specific details. In other instances, process operations and implementation details have not been described in detail, if already well known.

Embodiments of the present invention provide a method and system for providing an auto-play mode option to a user during gameplay of a video game. The auto-play mode option allows the user have portions of the game played by the system, e.g., an artificial intelligence (AI) player. A user play model is trained using state data from the user's prior and current gaming sessions to simulate the gameplay style of the user so the artificial intelligence (AI) player, which is driven by the model, will play the game in substantially the same way that the user would play the game. The user can choose to use the auto-play mode option to play the "grinding" portions of the game that the user does not like to play because, for example, the user finds these portions either less interesting or less exciting to play than other parts of the game. The grinding portions of the game can be identified by the system, e.g., a game server, using data from the user play model, and a notification can be presented to a display screen of a user device to provide the user with the option to use the auto-play mode during gameplay of the grinding portions of the game. When gameplay of the grinding portions of the game in auto-play mode is complete, a resume notification can be sent to the display screen of the user device to provide the user with the option to discontinue use of the auto-play mode and resume gameplay in active play mode. By using auto-play mode, users can avoid the need to play parts of a game that they do not like playing and reduce the amount of time it takes to complete the game because the AI player can play the grinding portions of the game at a faster speed. Further, because the AI player plays the game in the substantially the same way that the player would play the game, other players playing the game with the user will not be unhappy that the user has temporarily "left" the game during the grinding portions of the game.

Figure 1:
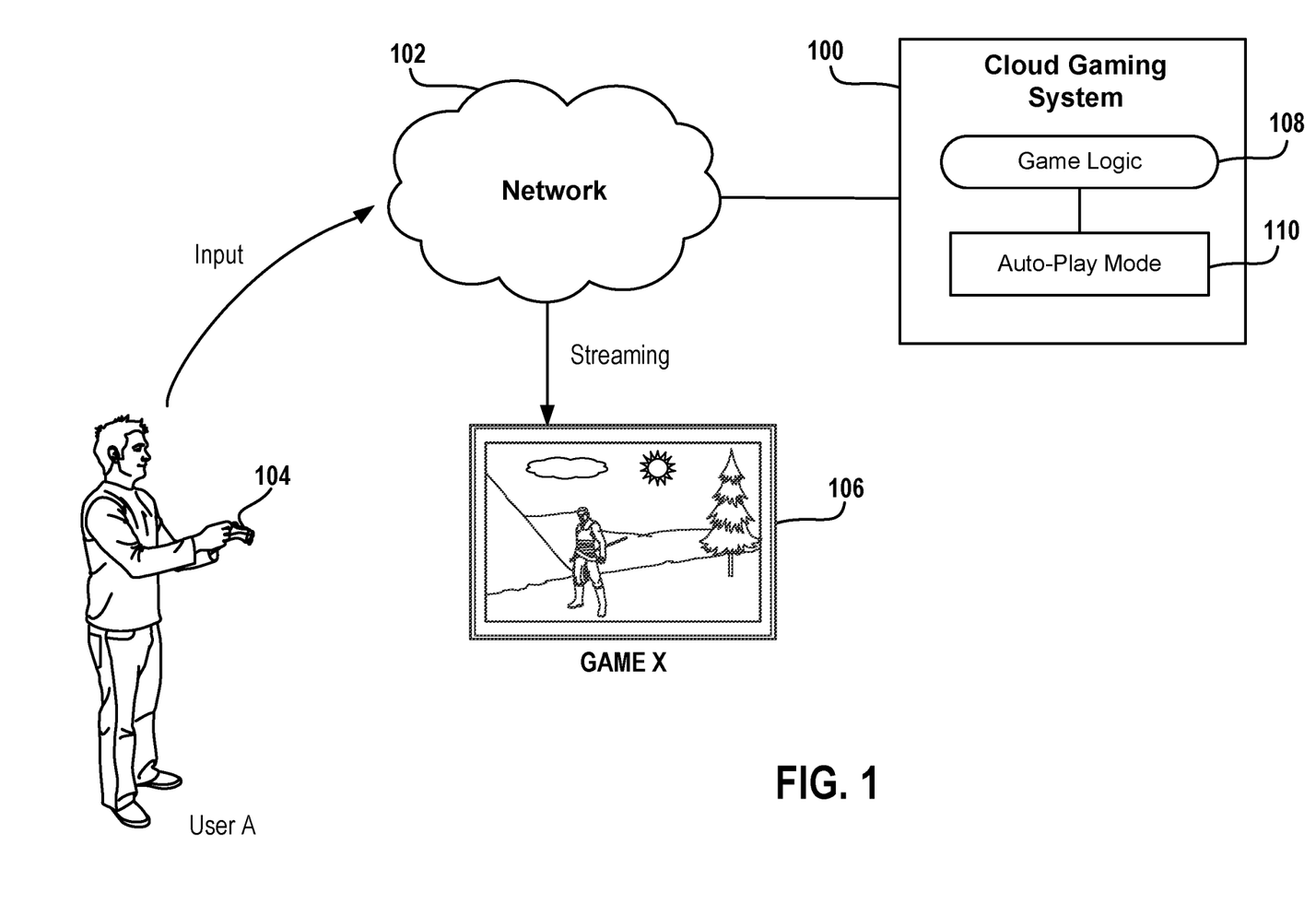
FIG. 1 is a simplified schematic diagram that illustrates a user playing an online video game via streaming (cloud) gaming, in accordance with one embodiment.

FIG. 1 is a simplified schematic diagram that illustrates a user playing an online video game via streaming (cloud) gaming, in accordance with one embodiment. As shown in FIG. 1, user A is connected to cloud gaming system 100 via network 102, e.g., the internet, to play Game X. Cloud gaming system 100 hosts a catalog of games (e.g., games A, B, C, D, E, F, and X) on a plurality of game servers. In one embodiment, the cloud gaming system 100 is part of a data center that includes, among other infrastructure, servers, data storage, streaming logic, user account management, and other services to enable gaming. In one embodiment, the cloud gaming system 100 is part of a digital entertainment service, e.g., the PlayStation Network (PSN). A game server of the cloud gaming system 100 includes a game engine, which includes various game components that game logic 108 uses to enable Game X to be run. In one embodiment, game logic 108 is provided with auto-play mode 110, which enables the game to be automatically played by artificial intelligence (AI) using data from a user play model. Addition details regarding the auto-play mode are described below with reference to FIGS. 2-4.

As is known to those skilled in the art, in streaming (cloud) gaming, the game is executed on the game server, e.g., one of the game servers of the cloud gaming system 100. The game server receives inputs (e.g., button presses) from the players involved in the game to drive interactivity at the game server and sends back video streams and audio streams to the connected devices of each of the players. In the embodiment shown in FIG. 1, user A transmits inputs (e.g., button presses) to a game server of cloud gaming system 100 via network 102 using controller 104. The game server receives the inputs from user A, as well as the inputs from any other users playing Game X with user A, and sends back video streams and audio streams to the connected device 106 of user A and the connected devices of any other users playing Game X with user A. By way of example, the connected devices of user A and any other players can include a computer, a tablet, a smartphone, a TV, and a head-mounted display (HMD). By way of example, when a player, e.g., user A, presses the "jump" button for a character, this input is uploaded to the game server and, usually within about 250 to 500 milliseconds, the game server sends back video frames showing the character jumping for display on the screen of user A's connected device 106 and the connected devices of any other players.

Figure 2:
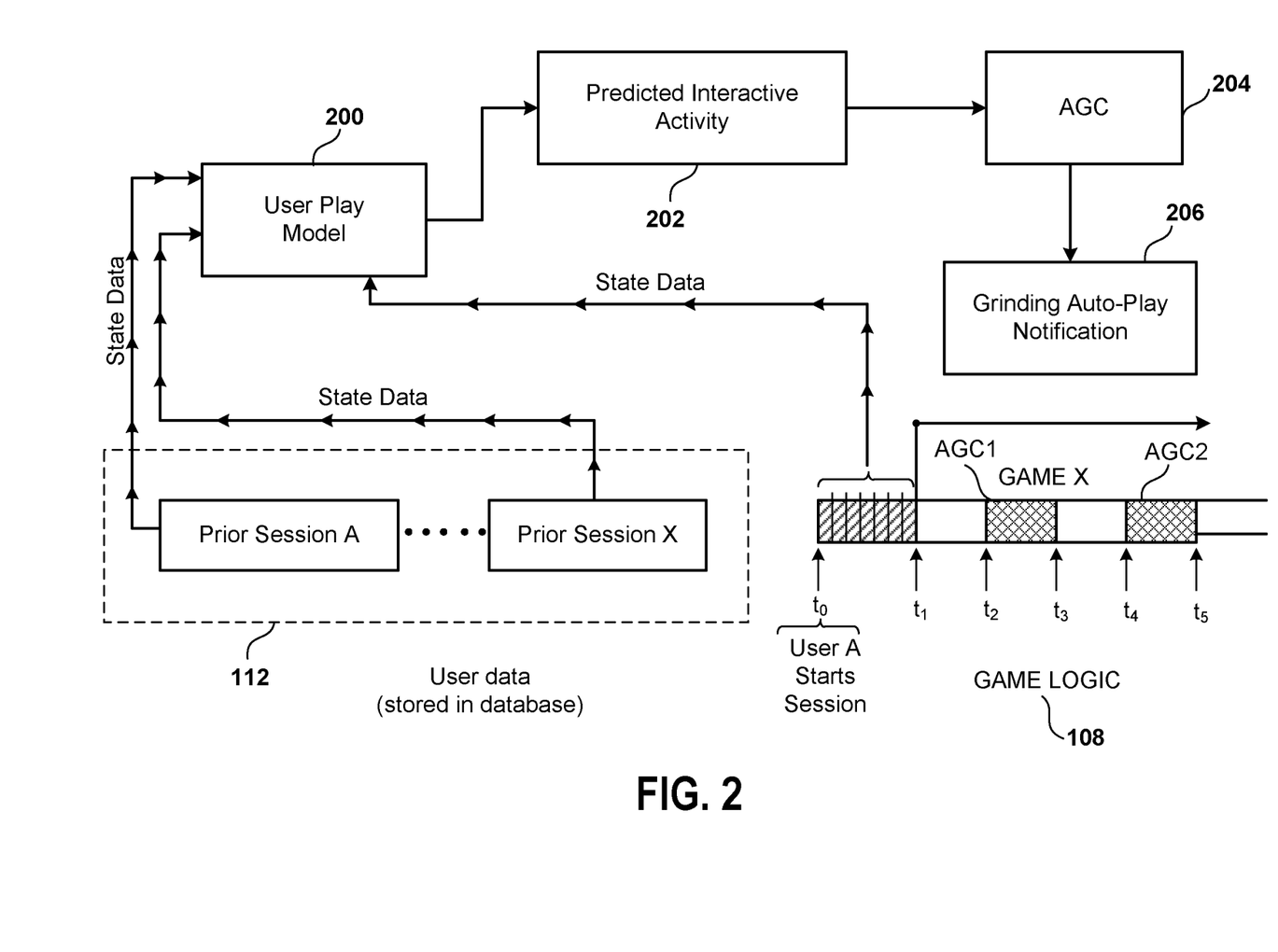
FIG. 2 is a simplified schematic diagram that illustrates accessing a user play model during a gaming session to identify anticipated grinding content (AGC), in accordance with one embodiment.

FIG. 2 is a simplified schematic diagram that illustrates accessing a user play model during a gaming session to identify anticipated grinding content (AGC), in accordance with one embodiment. As shown in FIG. 2, user A has started a gaming session playing Game X at time to. As user A plays Game X, state data regarding the gameplay is continuously generated and captured. As is known to those skilled in the art, the state data provides a stream of metadata descriptive of what is happening in the game. By way of example, the metadata (e.g., a list of data) can include what the user did in the game, what buttons were pushed, how the buttons were pushed, and what the user achieved (e.g., did the user win, lose, etc.). During gameplay, game logic 108 communicates the state data to user play model 200. In addition to the state data from user A's current gaming session, the user play model 200 also has access to the state data from user A's prior gaming sessions, e.g., prior sessions A thru X. In one embodiment, the state data from prior gaming sessions is part of user data 112, which can be stored in a suitable database. The state data from user A's current gaming session as well as the state data from user A's prior gaming sessions are used to train the user play model 200, as will be described in more detail below with reference to, for example, FIG. 4.

As user A plays Game X, the game server uses the user play model 200 to identify predicted interactive activity 202 that is predicted to occur ahead of the current time of the gameplay by the user. By way of example, at time $t_1$ of user A's gaming session, the user play model 200 evaluates the upcoming gameplay options for user A in Game X and predicts what game activity user A will engage in during an upcoming window of time. By way of example, if Game X is an adventure game and user A is hiking on a trail, user A might come to a fork in the trail and have the option to take a right turn onto a mountain path or take a left turn onto a creekside path. The tasks or adventures that will be required of user A are different for the mountain path and the creekside path. Thus, as user A is driving the direction of the game and can choose either of the two paths, it is necessary to predict which path user A is likely to take to ascertain the upcoming interactive activity in which user A will be engaged. This prediction can be made using data from the user play model, e.g., user A usually takes the creekside path. As such, in this scenario the predicted interactive activity at time $t_1$ of user A's gaming session will include the tasks or adventures that will be required of user A on the creekside path. In another example, if Game X is a racing game and user A is driving a car in lane 2, user A can decide to switch lanes into either lane 1 or lane 3 or stay in lane 2. Each of these three options provides different cars to either draft behind, pass, or avoid. If it is determined from the user play model that user A typically moves into lane 3 in this scenario, the predicted interactive activity at time $t_1$ of user A's gaming session would include drafting behind, passing, or avoiding the cars that user A will experience while driving in lane 3.

As noted above, the predicted interactive activity 202 includes the predicted game activity user A will engage in during an upcoming window of time. In one embodiment, the window of time is selected based on the type of video game being played. In the case of a relatively slow-moving game, e.g., an adventure game, the window of time to capture a sufficient amount of upcoming game activity could be in the range from about 15 seconds to about 2 minutes. In the case of a relatively fast-moving game, e.g., a racing game, the window of time to capture a sufficient amount of upcoming game activity could be in the range from about 3 seconds to about 15 seconds. In one embodiment, the window of time is dynamically set by the gaming system, e.g., cloud gaming system 100, using state data from the user play model 200 based on 1) what game activities are happening in the scene of the video game, and 2) what activity is required of the user in the scene of the video game. If a scene in the game involves zapping ghosts as the ghosts appear in the scene, the window of time could be relatively long, e.g., 1-2 minutes, if the ghosts appear in the scene at a relatively slow pace and the user can zap the ghosts from a fixed position (slow game activity/limited user activity). On the other hand, the window of time could be relatively short, e.g., 3-5 seconds, if the ghosts appear in the scene at a rapid pace and the user has to move quickly into a specified position before being able to zap a ghost (fast game activity/intense user activity). Thus, depending upon the game activities and user requirements involved in the scene of the game, the window of time can be dynamically set to have a duration that lasts from a few seconds up to a few minutes.

Once predicted interactive activity 202 has been identified, the game server uses the user play model 200 to analyze the predicted interactive activity to identify anticipated grinding content 204. As used herein, "anticipated grinding content" refers to game content that a user subjectively believes is not interesting to play and that can be objectively identified by the user play model using state data captured during the user's current and prior gaming sessions. By way of example, objective indicators that a user subjectively believes that a part of a video game is not interesting to play can include frequently disengaging from the game (terminating play) during that part of the game, skipping that part of the game, failing or performing poorly during that part of the game, or making comments regarding that part of the game in the comments/chat section of the game. Each of the foregoing objective indicators can be empirically determined by an algorithm that processes metadata in the state data from the user's current and prior gaming sessions. In one embodiment, the algorithm assigns weights to the objective indicators based on the relative significance of each of the objective indicators. For example, if a user left a comment in the comments/chat section of the game stating the user "hated playing" a part of the game, that objective indicator would be heavily weighted because it explicitly demonstrates that the user subjectively dislikes playing that part of the game. On the other hand, if a user occasionally performed poorly during a part of game, that objective indicator would be lightly weighted because the user's occasional poor performance during that part of the game does not definitively demonstrate that the user is subjectively not interested in playing that part of the game because there could be other reasons for the user's occasional poor performance.

As shown in FIG. 2, at time $t_1$ of user A's gaming session, the part of predicted interactive activity 202 that has been identified as being anticipated grinding content (AGC) 204 includes AGC1, which extends from time $t_2$ to time $t_3$, and AGC2, which extends from time $t_4$ to time $t_5$ is. In one embodiment, just before user A's gameplay reaches AGC1, which starts at time $t_2$ of the gaming session, the game server pauses the game and provides a grinding auto-play notification 206 to user A that identifies the AGC 204 (namely, AGC1) in the upcoming gameplay and provides user A with the option to use an auto-play mode during gameplay of AGC1. In one embodiment, the grinding auto-play notification 206 is presented to a display screen of the user device being used by the user during gameplay. Additional details regarding the notification process are described below with reference to FIG. 3. If the user, e.g., user A, opts to use the auto-play mode during gameplay of the AGC 204, the game server will access user play model 200 and use data from the user play model to automatically play the AGC for user A using a gameplay style that simulates the gameplay style of user A. When gameplay of the AGC in auto-play mode is complete, a resume notification is provided to user A providing user A with the option to discontinue use of the auto-play mode and resume gameplay in active play mode, as described in more detail below with reference to FIG. 3.

In one embodiment, when the user has opted to discontinue use of the auto-play mode and resume gameplay in active play mode, a summary of the game events that took place during gameplay of the AGC in auto-play mode is provided to the user before the user resumes gameplay the active play mode. In one embodiment, the summary of the game events is presented to a display screen of the user device being used by the user during gameplay. The summary of game events can include any key game events that the user should be aware of so that the user can make game moves/actions in active play mode that are consistent with the game events that took place during gameplay in auto-play mode. By way of example, the summary of game events can advise the user that quest "X" was completed, that items "A" and "B" were acquired, that resource "N" was gathered, etc.

Figure 3:
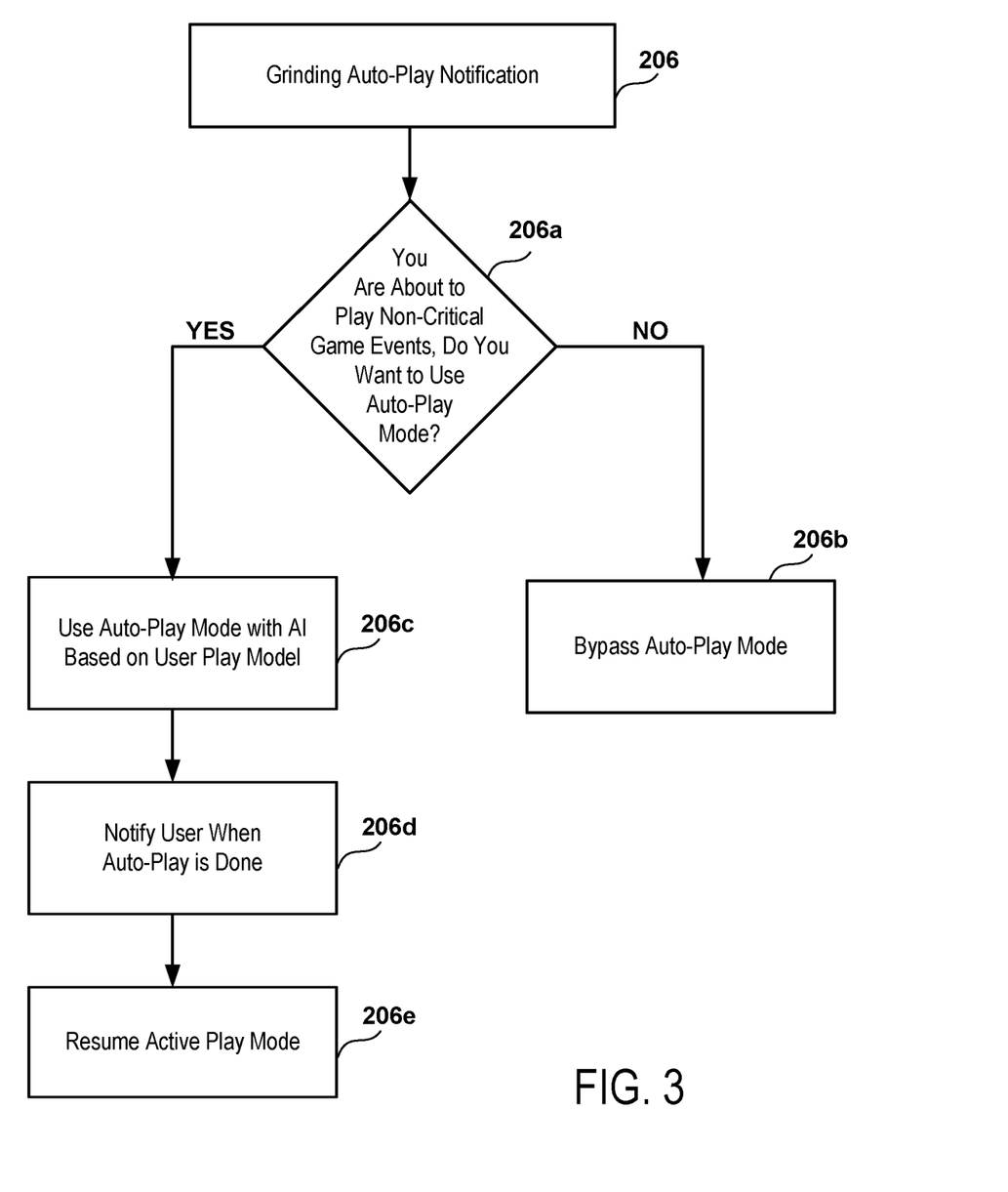
FIG. 3 is a flow diagram that illustrates additional details regarding the auto-play notification process, in accordance with one embodiment.

FIG. 3 is a flow diagram that illustrates additional details regarding the auto-play notification process, in accordance with one embodiment. As shown in FIG. 3, grinding auto-play notification 206 includes decision operation 206a in which the user is given the option to use auto-play mode. In one embodiment, decision operation 206a includes the following inquiry for the user: "You are about to play non-critical game events, do you want to use auto-play mode?" As used herein, "non-critical game events" refers to game events that are not central to the objective of the video game, and these non-critical game events can be AGC if the user does not like playing these events. If the user does not want to use auto-play mode, the notification process proceeds to bypass operation 206b in which the auto-play mode is bypassed and the user continues gameplay in active play mode. If the user opts to use auto-play mode, the notification process proceeds to auto-play operation 206c in which the auto-play mode is implemented to play the non-critical game events, e.g., AGC 204 (see FIG. 2). In one embodiment, the auto-play mode uses artificial intelligence (AI) based on a user play model, e.g., user play model 200 (see FIG. 2), to play the non-critical game events, e.g., AGC 204, using a gameplay style that simulates a gameplay style of the user, as described in more detail below with reference to FIG. 4. When gameplay of the non-critical game events, e.g., AGC 204, in the auto-play mode is complete, the game server pauses the game and provides a resume notification 206d to the user that provides the user with the option to discontinue use of the auto-play mode and resume gameplay in active play mode. In one embodiment, the resume notification 206d is presented to a display screen of the user device being used by the user during the gameplay. In other embodiments, the resume notification 206d can be sent to the user via a text message, e.g., SMS message or MMS message, or an email message. When the user is ready to resume playing the game, in resume operation 206e, the user can respond to the resume notification 206d and resume gameplay in active play mode. In one embodiment, the user can respond to the resume notification 206d by clicking on an appropriate interface, e.g., a button, presented on the display screen of the user device being used by the user during the gameplay. In other embodiments, the user can respond to the resume notification 206d by clicking on a link in a text message or an email message.

In one embodiment, the grinding auto-play notification 206 gives the user the option to customize the end of the AGC to be played in auto-play mode. By way of example, if the identified AGC, e.g., AGC1 shown in FIG. 2, includes quest "X" and quest "Y", the user could be given the option to end gameplay in auto-play mode when quest "X" is completed. In this example, the user is choosing to use auto-play mode to play less than all of the identified AGC (because quest "Y" will not be played in auto-play mode). If the identified AGC, e.g., AGC2 shown in FIG. 2, includes acquiring item "A" and item "B," the user could be given the option to end gameplay in auto-play mode when item "A", item "B", and item "C" have been acquired. In this example, the user is choosing to use auto-play mode to play more than all of the identified AGC (because the use of auto-play mode continued after item "A" and item "B" were acquired). The option to customize the end of the AGC to be played in auto-play mode can be presented to the user using any suitable user interface. In one embodiment, the option to customize the end of the AGC to be played in auto-play mode is presented to the user via a drop-down menu which can include one or more customization options.

Figure 4:
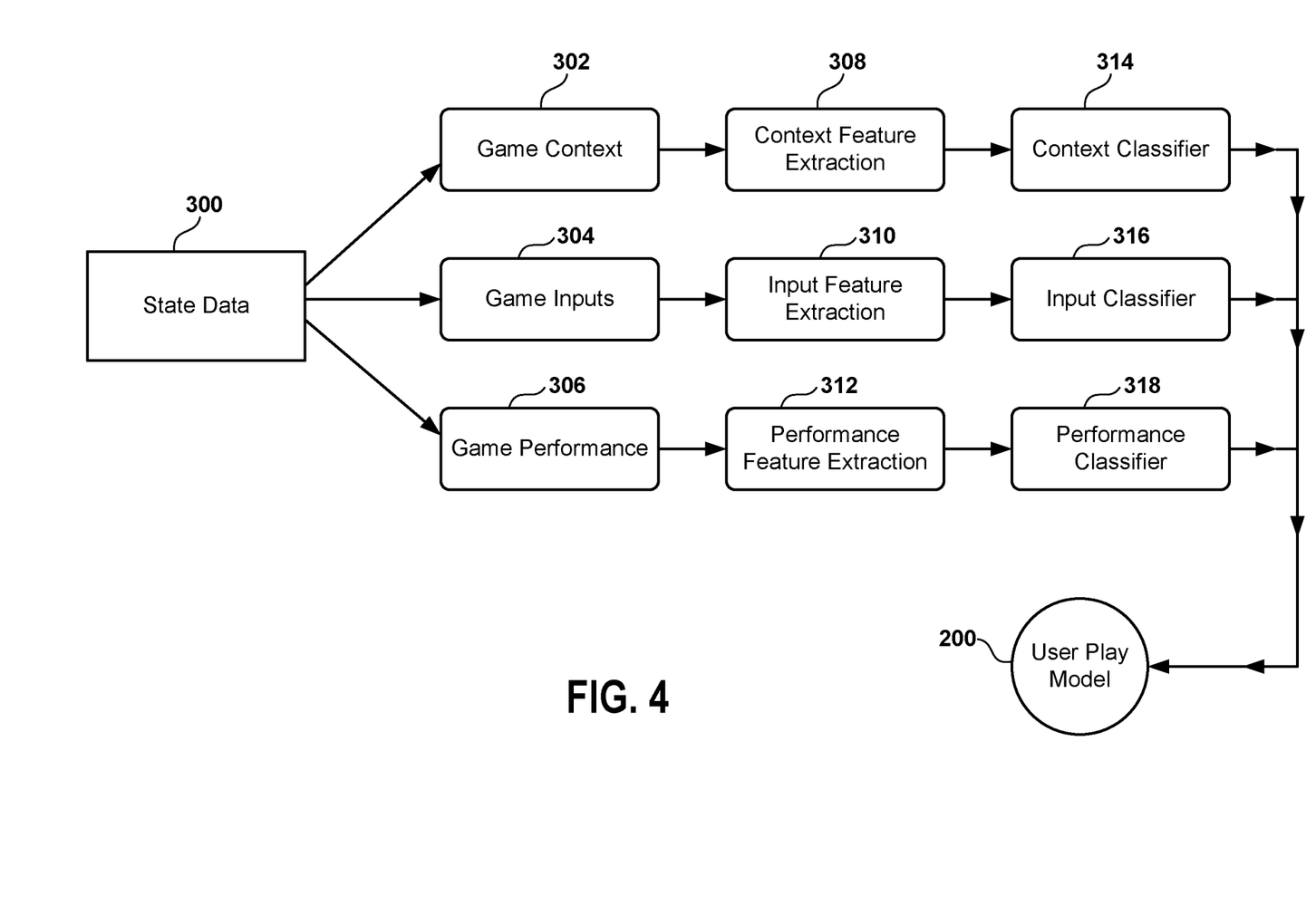
FIG. 4 is a simplified schematic diagram that illustrates a process for training the user play model using state data, in accordance with one embodiment.

FIG. 4 is a simplified schematic diagram that illustrates a process for training the user play model using state data, in accordance with one embodiment. As shown in FIG. 4, state data 300 is processed to identify state data regarding game context 302, state data regarding game inputs 304, and state data regarding game performance 306. In one embodiment, state data 300 includes state data from the user's prior gaming sessions, e.g., user data 112 shown in FIG. 2, as well as state data from the user's current gaming session. The state data regarding game context 302 provides a stream of metadata descriptive of what is happening in the game. By way of example, the metadata (e.g., a list of data) regarding what is happening in the game can include which players are present in the game, what item or items each player has in the game, e.g., a sword, a shield, etc., and other characteristics of the game. The state data regarding game inputs 304 provides a stream of metadata descriptive of the game moves that the user made in the game. By way of example, the metadata descriptive of the game moves that the user made in the game can include which buttons the user pressed, e.g., the user pressed the X button, the user pressed the Y button, etc., which direction the user went in the game, e.g., the user moved to the left, the user moved to the right, etc., and how the user moved in the game, e.g., did the user jump or did the user come to a stop? The state data regarding game performance 306 provides a stream of metadata descriptive of what the user accomplished in the game. By way of example, the metadata descriptive of what the user accomplished in the game can include how many points the user scored in the game, whether the user won or lost the game, and whether the user won a trophy or other award.

As stated above, the state data regarding game context 302 includes, in one embodiment, all of the state data regarding game context from the user's prior gaming sessions and the user's current gaming session. The user play model 200 does not use all of the state data regarding game context 302 to model how a user plays a game, e.g., Game X, but instead uses structured features from the state data regarding game context. As such, in context feature extraction 308, feature extractors scan the state data regarding game context 302 and extract certain features in the state data that are either being used in the user play model 200 or might be added to the user play model in the future. In one embodiment, the feature extractors are pieces of code that identify a predefined feature in the state data regarding game context 302 and extract that feature when it is identified in the state data regarding game context. This same feature extraction methodology is also applied to the state data regarding game inputs 304 and the state data regarding game performance 306. In particular, in input feature extraction 310, feature extractors scan the state data regarding game inputs 304 and extract certain features in the state data that are either being used in the user play model 200 or might be added to the user play model in the future. In one embodiment, the feature extractors are pieces of code that identify a predefined feature in the state data regarding game inputs 304 and extract that feature when it is identified in the state data regarding game inputs. In performance feature extraction 312, feature extractors scan the state data regarding game performance 306 and extract certain features in the state data that are either being used in the user play model 200 or might be added to the user play model in the future. In one embodiment, the feature extractors are pieces of code that identify a predefined feature in the state data regarding game performance 306 and extract that feature when it is identified in the state data regarding game performance.

The features extracted by context feature extraction 308, input feature extraction 310, and performance feature extraction 312 are then labeled for use in the user play model 200. In particular, context classifier 314 looks at the features extracted by context feature extraction 308 and adds an appropriate label to each of these features. In one embodiment, context classifier 314 is a piece of code that looks at the features extracted by context feature extraction 308 and adds a predefined label to each of these features, where the predefined label describes the nature of the game context for each feature. By way of example, if a feature relates to a user walking on a mountain path, the predefined label for the feature could be "mountain path." This same feature labeling methodology is also applied to the features extracted by input feature extraction 310 and performance feature extraction 312. In particular, input classifier 316 looks at the features extracted by input feature extraction 310 and adds an appropriate label to each of these features. In one embodiment, input classifier 316 is a piece of code that looks at the features extracted by input feature extraction 310 and adds a predefined label to each of these features, where the predefined label describes the nature of the game input for each feature. Performance classifier 318 looks at the features extracted by performance feature extraction 312 and adds an appropriate label to each of these features. In one embodiment, performance classifier 318 is a piece of code that looks at the features extracted by performance feature extraction 312 and adds a predefined label to each of these features, where the predefined label describes the nature of the game performance for each feature. By way of example, if a feature relates to a user winning a trophy for a strong performance in a game, the predefined label for the feature could be "trophies."

The classified features (the extracted features to which a label has been added) generated by the context classifier 314, the input classifier 316, and the performance classifier 318 are fed into user play model 200 to train the model. In one embodiment, the user play model 200 is a deep learning model that takes the classified features from the user's gaming sessions and, using machine learning techniques, determines patterns and relationships between these features to learn and predict how the user plays a video game. In this manner, the game play model 200 can simulate a gameplay style of the user for a particular game, e.g., Game X. In particular, the user play model 200 can be queried and the model can be used to drive interactive activity by the AI player, which represents the user during auto-play of the AGC. As classified features from more of the user's gaming sessions are fed into the user play model 200, the continuous training of the model provides reinforced learning that assists in strengthening the model to increase the degree to which the model can simulate the gameplay style of the user.

During the course of gameplay, if the user opts to use auto-play mode to play AGC, the AI player will play the AGC for the user in a manner that simulates the gameplay style of the user. As such, other players playing the game with the user will not be unhappy that the user has temporarily "left" the game because the AI player will be acting in substantially the same way that the user would act during gameplay of the AGC. In one embodiment, each time AGC is completed in auto-play mode, game metrics related to the auto-play mode are saved for viewing. This enables the user to review what the AI player did during the gameplay in auto-play mode and, if desired, to make changes and/or adjustments to gameplay style used by the AI player on behalf of the user. In the event the user makes changes and/or adjustments to the gameplay style used by the AI player in auto-play mode, these changes and/or adjustments are fed into the user play model 200 and this training of the model provides supervised learning that assists in strengthening the model to increase the degree to which the model can simulate the gameplay style of the user.

In one embodiment, when auto-play mode is being used to play AGC, the AI player plays the AGC at a faster speed than the user would typically play that portion of the game. In this manner, the length of time required for a user to play the game in its entirety can be shortened.

Figure 5:
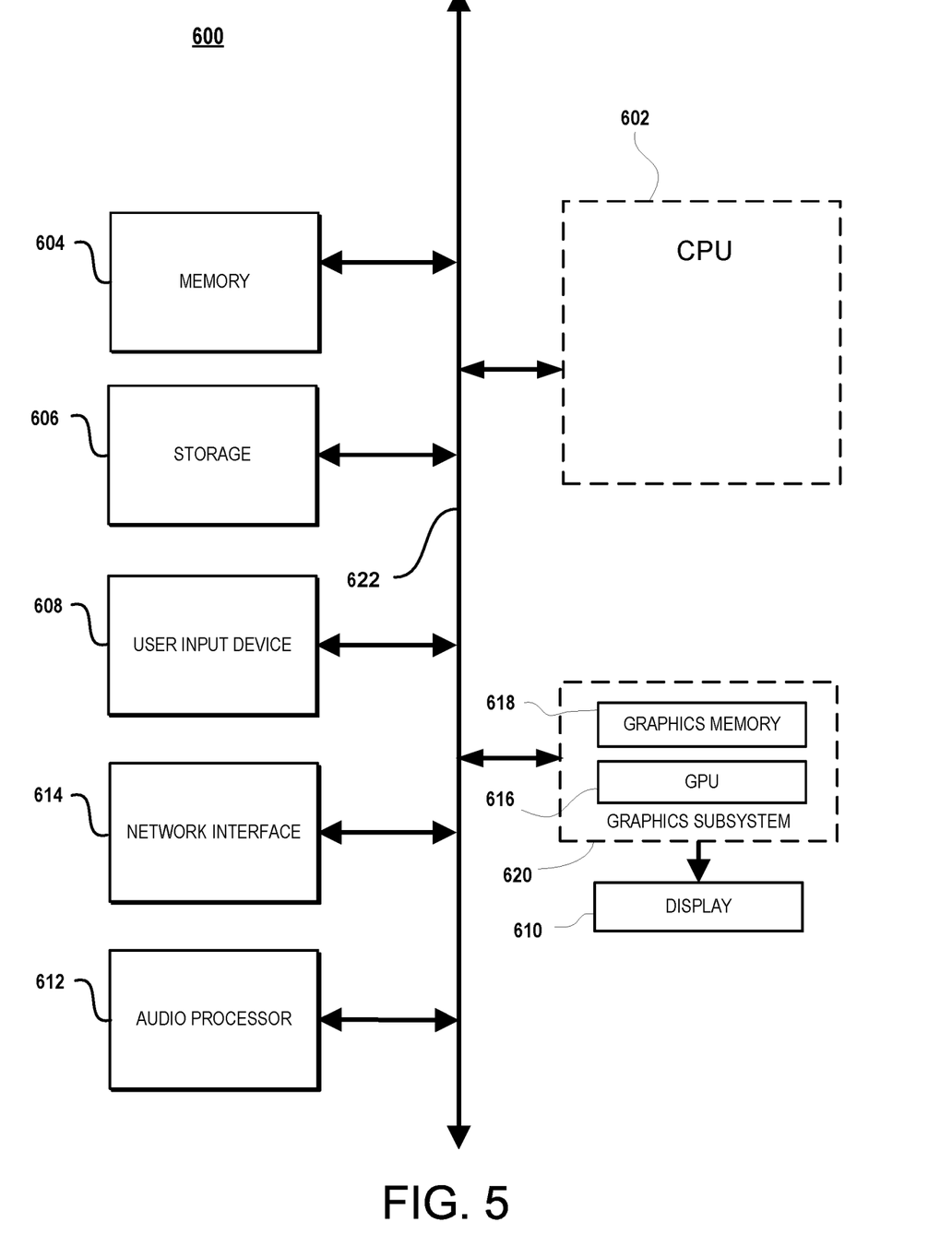
FIG. 5 illustrates components of an example device that can be used to perform aspects of the various embodiments of the present disclosure.

FIG. 5 illustrates components of an example device 600 that can be used to perform aspects of the various embodiments of the present disclosure. In particular, the block diagram of FIG. 5 illustrates a device 600 that can incorporate or can be a personal computer, video game console, personal digital assistant, a server or other digital device, suitable for practicing an embodiment of the disclosure. Device 600 includes a central processing unit (CPU) 602 for running software applications and optionally an operating system. CPU 602 may be comprised of one or more homogeneous or heterogeneous processing cores. For example, CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 600 may be local to a player playing a game segment (e.g., game console), or remote from the player (e.g., back-end server processor), or one of many servers using virtualization in a game cloud system for remote streaming of gameplay to clients.

Memory 604 stores applications and data for use by the CPU 602. Storage 606 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 608 communicate user inputs from one or more users to device 600, examples of which may include keyboards, mice, joysticks, touch pads, touch screens, still or video recorders/cameras, tracking devices for recognizing gestures, and/or microphones. Network interface 614 allows device 600 to communicate with other computer systems via an electronic communications network, and may include wired or wireless communication over local area networks and wide area networks such as the internet. An audio processor 612 is adapted to generate analog or digital audio output from instructions and/or data provided by the CPU 602, memory 604, and/or storage 606. The components of device 600, including CPU 602, memory 604, data storage 606, user input devices 608, network interface 610, and audio processor 612 are connected via one or more data buses 622.

A graphics subsystem 620 is further connected with data bus 622 and the components of the device 600. The graphics subsystem 620 includes a graphics processing unit (GPU) 616 and graphics memory 618. Graphics memory 618 includes a display memory (e.g., a frame buffer) used for storing pixel data for each pixel of an output image. Graphics memory 618 can be integrated in the same device as GPU 608, connected as a separate device with GPU 616, and/or implemented within memory 604. Pixel data can be provided to graphics memory 618 directly from the CPU 602. Alternatively, CPU 602 provides the GPU 616 with data and/or instructions defining the desired output images, from which the GPU 616 generates the pixel data of one or more output images. The data and/or instructions defining the desired output images can be stored in memory 604 and/or graphics memory 618. In an embodiment, the GPU 616 includes 3D rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 620 periodically outputs pixel data for an image from graphics memory 618 to be displayed on display device 610. Display device 610 can be any device capable of displaying visual information in response to a signal from the device 600, including CRT, LCD, plasma, and OLED displays. Device 600 can provide the display device 610 with an analog or digital signal, for example.

It should be noted that access services, such as providing access to games of the current embodiments, delivered over a wide geographical area often use cloud computing. Cloud computing is a style of computing in which dynamically scalable and often virtualized resources are provided as a service over the internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the internet, based on how the internet is depicted in computer network diagrams and is an abstraction for the complex infrastructure it conceals.

A game server may be used to perform the operations of the durational information platform for video game players, in some embodiments. Most video games played over the internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs the detection of which does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the objects, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although method operations may be described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the telemetry and game state data are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation may be produced by an emulator. In either case, if the video game is represented as a simulation, that simulation is capable of being executed to render interactive content that can be interactively streamed, executed, and/or controlled by user input.

Accordingly, the disclosure of the example embodiments is intended to be illustrative, but not limiting, of the scope of the disclosures, as set forth in the following claims. Although example embodiments of the disclosures have been described in some detail for purposes of clarity of understanding, it will be apparent that certain changes and modifications can be practiced within the scope and equivalents of the following claims. In the following claims, elements and/or steps do not imply any particular order of operation, unless explicitly stated in the claims or implicitly required by the disclosure.

What is claimed is:

1. A method for providing an auto-play mode option to a user during gameplay of a video game by the user, comprising:
    accessing, by a server, a user play model of the user, the user play model incorporating extracted features related to the gameplay by the user and classification of the extracted features related to the gameplay by the user, the accessing of the user play model is triggered at a current time during the gameplay by the user;
    identifying, by the server, predicted interactive activity that is predicted to occur ahead of the current time of the gameplay by the user, the predicted interactive activity is identified in part using data from the user play model;
    identifying, by the server, at least part of the predicted interactive activity to be anticipated grinding content (AGC), the AGC is identified in part using data from the user play model; and
    providing a notification, by the server, that is presented to a display screen of a user device used by the user during the gameplay, the notification identifies the AGC in upcoming gameplay and provides the user with an option to use an auto-play mode during gameplay of the AGC, the auto-play mode using data from the user play model to automatically play the AGC for the user using a gameplay style that simulates a gameplay style of the user.

2. The method of claim 1, wherein the user play model is trained from one or more game sessions by the user using data state data produced during the one or more game sessions to produce the extracted features from game context, game inputs, and game performance for further processing the classification of the extracted features, and wherein the training provides reinforced learning that assists in continuously strengthening the user play model to increase a degree to which the user play model can simulate a gameplay style of the user.

3. The method of claim 1, wherein the option for the auto-play mode is enabled responsive to the user choosing to allow the auto-play mode to play the AGC, and wherein, when gameplay of the AGC in auto-play mode is complete, a resume notification is presented to the display screen of the user device used by the user during the gameplay, the resume notification providing the user with an option to discontinue use of the auto-play mode and resume gameplay in active play mode.

4. The method of claim 3, wherein for each segment of AGC completed using auto-play mode, game metrics related to the auto-play mode are saved for viewing.

5. A non-transitory computer readable medium containing program instructions for providing an auto-play mode option to a user during gameplay of a video game by the user, wherein execution of the program instructions by one or more processors of a computer system causes the one or more processors to carry out the operations of:
    accessing, by a server, a user play model of the user, the user play model incorporating extracted features related to the gameplay by the user and classification of the extracted features related to the gameplay by the user, the accessing of the user play model is triggered at a current time during the gameplay by the user;
    identifying, by the server, predicted interactive activity that is predicted to occur ahead of the current time of the gameplay by the user, the predicted interactive activity is identified in part using data from the user play model;
    identifying, by the server, at least part of the predicted interactive activity to be anticipated grinding content (AGC), the AGC is identified in part using data from the user play model; and
    providing a notification, by the server, that is presented to a display screen of a user device used by the user during the gameplay, the notification identifies the AGC in upcoming gameplay and provides the user with an option to use an auto-play mode during gameplay of the AGC, the auto-play mode using data from the user play model to automatically play the AGC for the user using a gameplay style that simulates a gameplay style of the user.

6. The non-transitory computer readable medium of claim 5, wherein the user play model is trained from one or more game sessions by the user using data state data produced during the one or more game sessions to produce the extracted features from game context, game inputs, and game performance for further processing the classification of the extracted features, and wherein the training provides reinforced learning that assists in continuously strengthening the user play model to increase a degree to which the user play model can simulate a gameplay style of the user.

7. The non-transitory computer readable medium of claim 5, wherein the option for the auto-play mode is enabled responsive to the user choosing to allow the auto-play mode to play the AGC, and wherein, when gameplay of the AGC in auto-play mode is complete, a resume notification is presented to the display screen of the user device used by the user during the gameplay, the resume notification providing the user with an option to discontinue use of the auto-play mode and resume gameplay in active play mode.

8. The non-transitory computer readable medium of claim 7, wherein for each segment of AGC completed using auto-play mode, game metrics related to the auto-play mode are saved for viewing.

9. A method for providing an auto-play mode option to a user during gameplay of a video game by the user, comprising:
    accessing, by a server, a user play model of the user, the user play model incorporating extracted features related to the gameplay by the user and classification of the extracted features related to the gameplay by the user, the accessing of the user play model is triggered at a current time during the gameplay by the user;

identifying, by the server, predicted interactive activity that is predicted to occur ahead of the current time of the gameplay by the user, the predicted interactive activity is identified in part using data from the user play model;

identifying, by the server, at least part of the predicted interactive activity to be anticipated grinding content (AGC), the AGC is identified in part using data from the user play model;

providing a notification, by the server, that is presented to a display screen of a user device used by the user during the gameplay, the notification identifies the AGC in upcoming gameplay and provides the user with an option to use an auto-play mode during gameplay of the AGC; and when the option to use the auto-play mode is enabled responsive to the user choosing to allow the auto-play mode to play the AGC, using, by the server, the auto-play mode during gameplay of the AGC, the auto-play mode using data from the user play model to automatically play the AGC for the user using a gameplay style that simulates a gameplay style of the user.

* * * * *